H. BERTRAM.
MACHINE FOR DIVIDING AND WORKING DOUGH.
APPLICATION FILED AUG. 3, 1915.

1,303,454.

Patented May 13, 1919.
6 SHEETS—SHEET 1.

Fig. 1.

Inventor
Hermann Bertram
by John Lotka
Attorney

H. BERTRAM.
MACHINE FOR DIVIDING AND WORKING DOUGH.
APPLICATION FILED AUG. 3, 1915.

1,303,454.

Patented May 13, 1919.
6 SHEETS—SHEET 4.

Inventor
Hermann Bertram
by John Lotka
Attorney

UNITED STATES PATENT OFFICE.

HERMANN BERTRAM, OF HALLE-ON-THE-SAALE, GERMANY.

MACHINE FOR DIVIDING AND WORKING DOUGH.

1,303,454.   Specification of Letters Patent.   Patented May 13, 1919.

Application filed August 3, 1915. Serial No. 43,495.

*To all whom it may concern:*

Be it known that I, HERMANN BERTRAM, a citizen of the German Empire, and a resident of Halle-on-the-Saale, Germany, have invented certain new and useful Improvements in Machines for Dividing and Working Dough, of which the following is a specification.

My present invention relates to machines for dividing and working dough, and particularly to machines in which a batch of dough is first divided into a number of portions which are then subjected, within the dough-dividing mechanism, to an operation similar in effect to the customary kneading by hand. In machines of this class, the various adjustments required for the several steps of the operation, have heretofore been effected manually, as by throwing levers from one position to another. Thus in a machine in which the dividing mechanism also performs the kneading operation, the first step consists in moving a table carrying the batch of dough, toward a pressure plate, so as to compress the dough between said plate and the table, or a carrier set on said table. The next step consists in releasing a clutch which up to that time has connected the pressure plate with the dividing mechanism, so that when the table continues to move after said two parts have been disconnected, the dough will be pressed against the knives of the dividing mechanism and cut by them into separate portions or lumps. Thereupon the drive of the dividing mechanism is thrown into action, so as to impart to this mechanism the (usually gyratory) movement which accomplishes the kneading of the dough. After this kneading operation has been continued for a time depending on the character of the dough, the drive of the dividing mechanism is stopped, and the table is moved away manually from the dividing mechanism, whereupon the dough-carrier with the kneaded lumps of dough lying thereon may be removed, and another carrier, with a fresh batch of dough, placed in the machine.

The object of my present invention is to carry out all the steps indicated above, except the insertion and removal of the carrier with the fresh batch and the kneaded lumps respectively, in an automatic manner, after an operating lever has been thrown in manually at the beginning of the operation. The improved machine also comprises automatic or manually-operated regulating and adjusting devices for varying the nature of the machine's work within wide limits, as may be necessary in practice according to the character of the dough to be treated.

In the accompanying drawings a typical example of a dividing and kneading machine embodying my invention has been illustrated, Figure 1 being a front elevation of the machine, with parts in section and other parts removed.

In the construction illustrated by the drawings, a main shaft 2 is journaled in the lower portion of the machine frame 1. On this shaft are mounted loosely two driving pulleys 3, 4 connected rigidly with each other, the pulley 3 being adapted to receive the belt or other device (not shown) for applying power to the machine, while from the pulley 4 a belt 5 leads to a pulley 7 mounted loosely upon a shaft 6 journaled at the upper portion of the frame 1. The driving pulley 3 contains the one half or member of a clutch, the other member of which, 8, is held to rotate with the shaft 2, but may be moved lengthwise thereof by means of a lever 10 fulcrumed at 9. A feather-and-groove connection may be employed for this purpose between the shaft 2 and the clutch member 8.

On the main shaft 2 is also secured rigidly a worm 11, in mesh with a worm wheel 13 mounted on a shaft 12. The latter is likewise journaled in the frame 1 and is provided at one end with a crank 14, with the pin 15 of which a rod 16 is connected pivotally. This rod is hollow and receives a longitudinally sliding rod 17, pivotally connected with the pin 18 of a crank arm 20 secured to a shaft 19. The rod or sleeve 16 is provided with a collar 21 engaged by a coiled spring 22 whose other end engages a disk or collar 23 adjustable longitudinally on the rod 17, as by screwing said disk on the rod. The sleeve 16 and the rod 17 together constitute a (telescopic) connecting rod for the crank 14.

Figure 4:
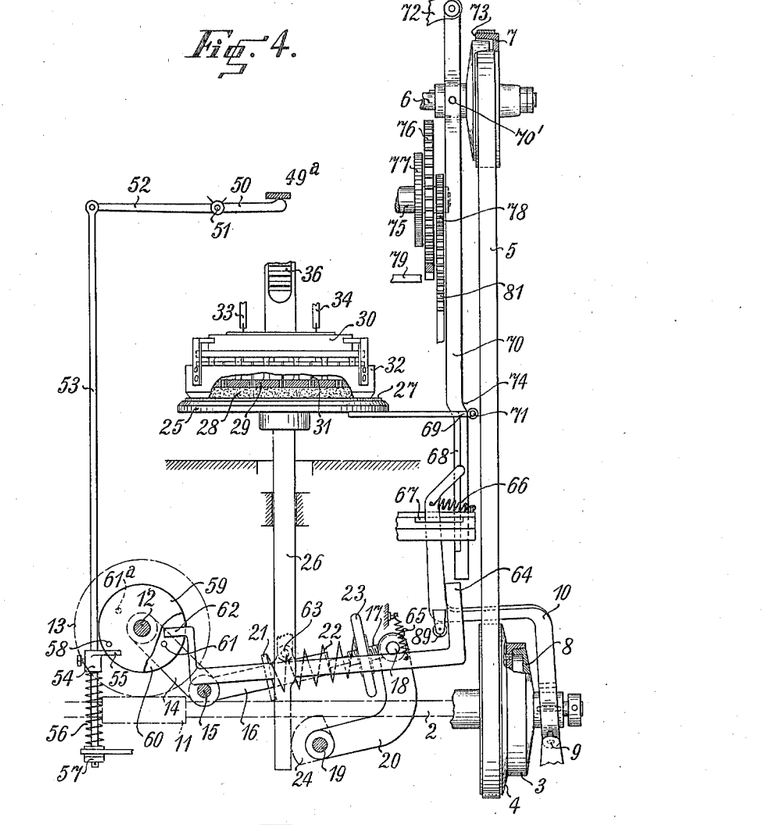
Fig. 4 is a front elevation of the main parts of the machine (partly in section) at the moment when the batch of dough fills completely the space between the carrier and the pressure plate.
Figure 6:
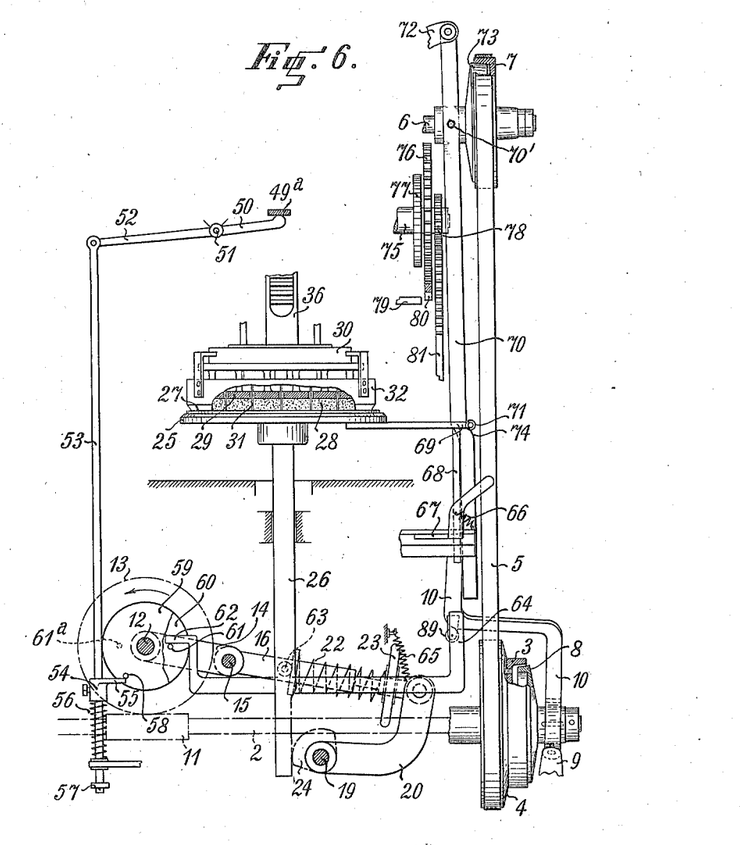
Fig. 6 is a view similar to Fig. 4, but showing the position of the parts at the beginning of the kneading operation.

On the shaft 19, journaled in the frame 1, is secured a toothed segment 24, in mesh with rack teeth on the vertical spindle 26 which carries the table 25. In the normal or initial position (Fig. 1), this table receives, in the well-known manner, the removable carrier plate 27 supporting the batch of dough 28. In this position, the pressure plate 29 with the knife-frame 30 integral with said plate, the individual knives 31 and the ring 32 which surrounds the dough during the kneading operation, are above the table 25. The knives 31 are connected by four rods 33, 34 with a sleeve 35, surrounding a rod 36 carrying the knife-frame 30, said sleeve being secured to a frame 37. In the latter there are contained two eccentrices 38, 39, secured to vertical shafts journaled in the frame of the machine, the upper ends of said shafts carrying bevel pinions 40, 41, in mesh with bevel wheels 42, 43 respectively secured to the shaft 6. It will be understood that the knives 31, rods 33, 34, sleeve 35 and frame 37 are connected with each other so as to move up and down in unison. These parts however are movable vertically relatively to the plunger or pressure plate 29 and to the parts connected with said plate, viz. the knife-frame 30 and the rod 36, these three parts 29, 30, 36 moving up and down in unison. The ring 32 is loose, and in the position illustrated by Figs. 1 and 2 slides down by gravity until angle irons secured to said ring rest on a suitable supporting surface of the knife frame 30. When engaged by the rising carrier plate 27, the ring 32 will move upwardly relatively to the knife-frame 30, as shown in Figs. 4 and 6.

The rod 36 is connected at its upper end by a link 44 with one end of a two-armed lever 45, fulcrumed on the frame 1 at 46 and carrying an adjustable weight 47 at its other end. This weight is adjusted so as to balance entirely or approximately, the weight of the knife-frame 30.

Figure 1:
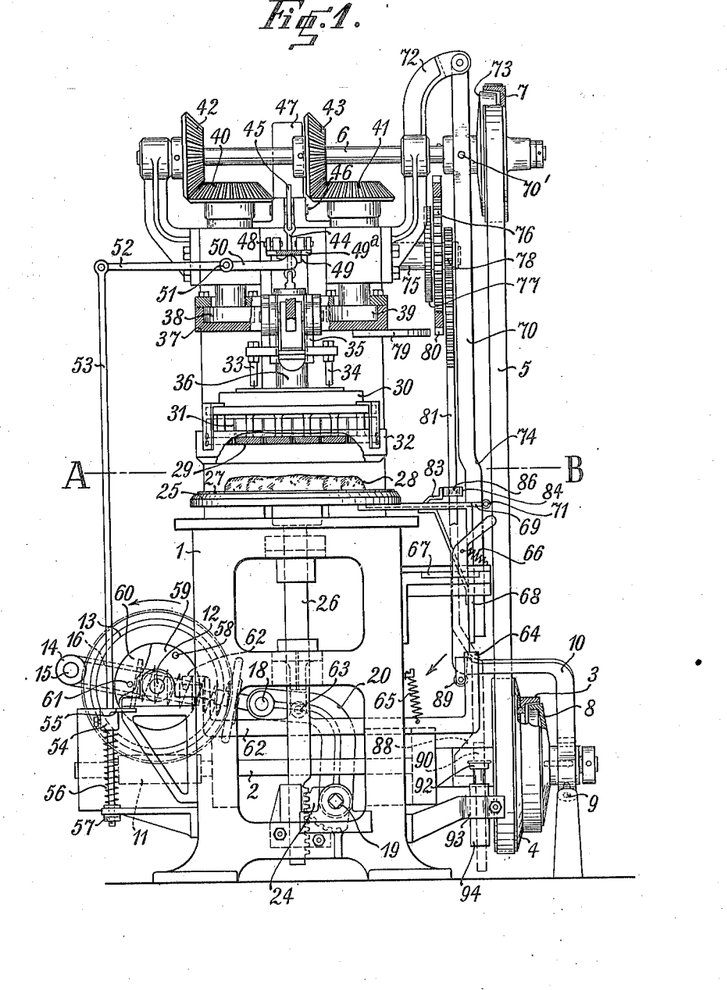
Figure 2:
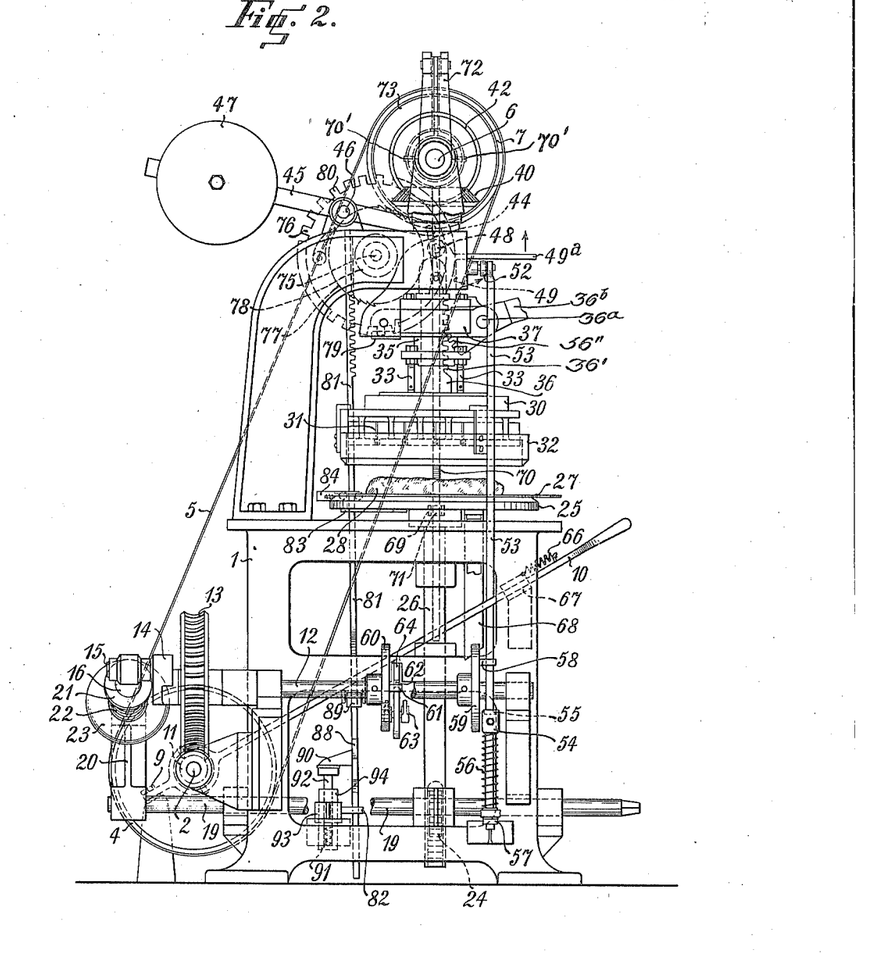
Fig. 2 is a side elevation.
Figure 3:
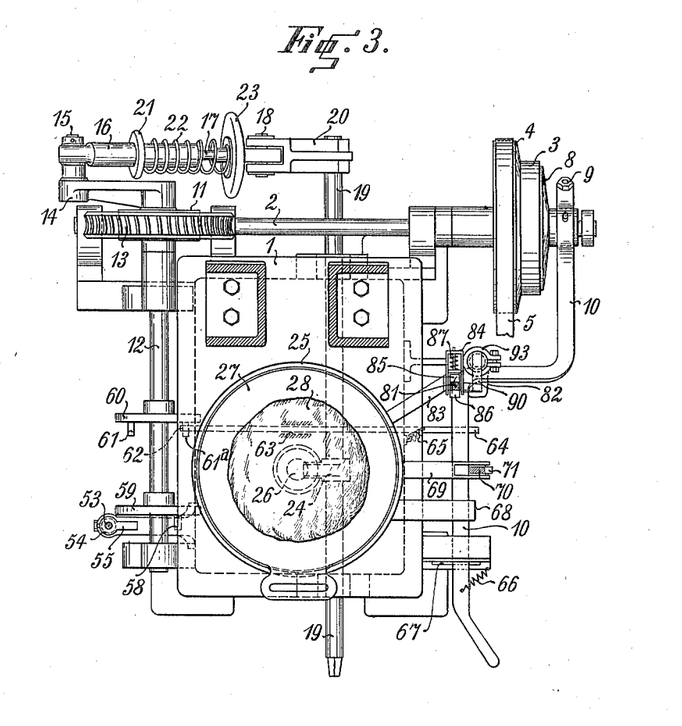
Fig. 3 is a plan, with parts in section on the line A—B of Fig. 1.

A latch 49, provided with a handle 49ª, is fulcrumed on the machine frame 1 at 48, which latch, in the position illustrated by Fig. 2, engages the upper end of the rod 36. The handle 49ª of this latch is adapted to be engaged from below by the end 50 of a two-armed lever fulcrumed at 51, the other end 52 of said lever being connected pivotally with a rod 53. This rod is adjustable upon the frame of the machine and carries a sleeve 54, provided with a projection or lug 55 and engaged at its lower end by a coiled spring 56. The other end of this spring engages a guide for the rod 53, which guide is secured to the frame of the machine; said spring will thus constantly tend to hold the rod 53 in the position determined by the adjusting ring or collar 57, and therefore to hold the lever 50, 52 in the position shown in Fig. 1.

The projection 55 of the sleeve 54 is in the path of a pin 58 projected from a disk 59 secured to the shaft 12. This shaft also carries another disk 60, provided with two pins 61, 61ª in positions 180° from each other, the one end 62 of a two-armed lever fulcrumed on the machine frame at 63, lying in the path of said pins. The other end 64 of this lever (Figs. 4 and 5), under the influence of a spring 65, will when the clutch 3, 8 is in operative position, engage the lever 10 and hold it in the operative position, Fig. 4, against the action of the spring 66 tending to release the clutch. A guide 67 is provided for the upper end of the lever 10.

In the path of the lever 10 is further located a rod 68, of angular shape (Fig. 1), the horizontal upper member of said rod being secured to the underside of the table 25. To this table is also secured an arm 69, provided with a forked end embracing a rod 70 and with a roller 71 in engagement with the outer surface of said rod. The rod 70 is suspended from the bracket 72 and is adapted to shift lengthwise of the shaft 6, a clutch member 73 held to rotate with said shaft and adapted for engagement with the mating clutch member formed on the driving pulley 7. For instance, a feather-and-groove connection is employed to cause the clutch member 73 to rotate with the shaft 6 while allowing it to move lengthwise thereof, and the connection between the clutch member 73 and the rod 70 may be effected by means of two pins 70′ (Fig. 2) carried by said rod and engaging a circumferential groove in the hub of the clutch member 73. The rod 70 is provided with an inclined portion 74, and its lower end is in the path of the lever 10.

Upon a stud 75 parallel to the shaft 6 is mounted to turn an escapement wheel 76, connected rigidly with a ratchet wheel 77 on one side and with a spur pinion 78 on the other side. An arm 79, secured to the frame 37, coöperates with the escapement wheel 76 in such a manner as to cause said wheel to be fed the space of one tooth 80 at each outward movement of the frame 37, the forward end of the arm 79 being preferably beveled for this purpose.

Figures 7, 8:
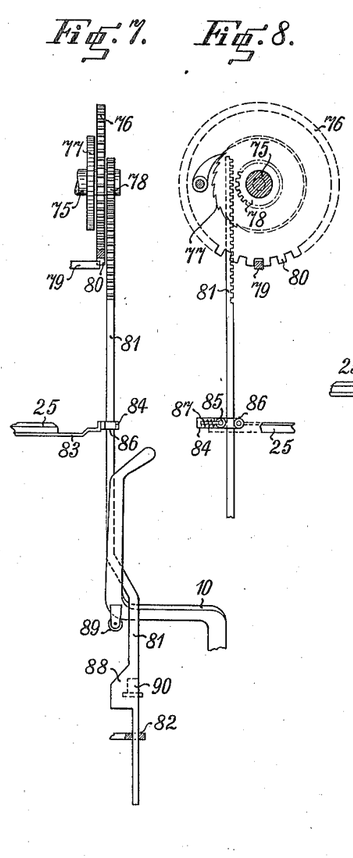
Figs. 7 and 8 show certain details of the mechanism in side elevation and front elevation respectively, and Figs. 9 and 10 correspond to Figs. 7 and 8 respectively, but show the parts at another stage of the operation.
Figures 9, 10:
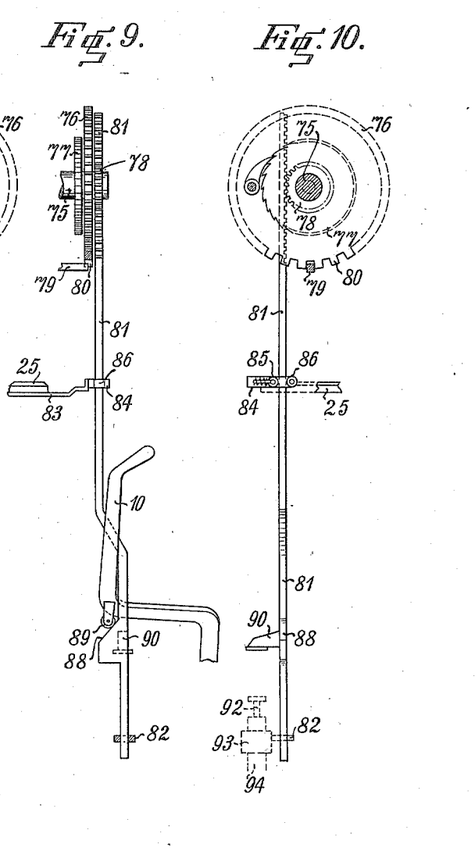

The spur pinion 78 is adapted for engagement by a rack 81, the lower end of which is received in a guide 82 secured to the frame 1, and the central portion of this rack is also guided. For this purpose an arm 83, carrying a frame 84 with rollers 85, 86 journaled therein, is secured to the table 25. The roller 85 is movable in said frame toward and from the roller 86, being pressed toward said roller by a spring 87, and the two rollers 85, 86 engage the rod or rack 81 on opposite sides and guide it. The rack 81, in addition to its sliding motion in the guide 82, is capable of a slight swinging motion in said guide, so as to carry said rack either into engagement with the spur pinion 78 (Fig. 10) or out of engagement therewith (Fig. 8), it being understood that the path of the rollers 85, 86 is so located relatively to the guide 82 as to produce this result. Thus, Fig. 2 shows that the portion of the rack rod 81 engaged by the two rollers 85, 86, is not directly above the portion engaged by the guide 82; in other words, when the table 25 is in its lower position (see Figs. 2 and 8) the rack 81 is inclined to the left toward its upper end, and when the table has gone up (Fig. 10), the rack still has a slight inclination in the same direction. Below the lever 10, the rack bar 81 is provided with an inclined surface 88, in the path of which is located a roller 89 carried by said lever 10. The rack bar 81 is further provided with a stop 90, adapted to engage a buffer 92 guided in a sleeve 94 held stationary by means of clamping jaws 93; the buffer 92 is pressed upward by a spring 91 (Fig. 2) and may be adjusted up or down by loosening the jaws 93 and adjusting the guide sleeve 94 vertically. In Fig. 2 I have shown rack teeth 36′ on the rod 36, in engagement with a pinion 36″ pivoted on the frame at 36ᵃ and provided with a handle 36ᵇ, by the operation of which the rod 36 and the parts 29, 30 connected therewith may be lifted when it is desired to expose the knives 31 for cleaning or other purposes.

At the beginning of the operation, the parts are in the position shown in Fig. 1. A carrier 27 with a batch of dough 28 thereon having been put on the table 25, the lever 10 is thrown inwardly, in the direction of the arrow in Fig. 1, until the end 64 of the lever fulcrumed at 63, which until then was under the lever 10, as shown in Figs. 1 and 2, is caused by the spring 65 to engage behind the lever 10, as shown in Fig. 4. This movement of the lever 10 causes the clutch 3, 8 to be thrown in, so as to start the main shaft 2 and, through the medium of the worm gearing 11, 13, the shaft 12 is also rotated. During this rotation, the crank 14 will rotate contra-clockwise, and the connecting rod 16, 17 will shift or move the arm 20 toward the right, so as to rock the segment 24 in such a manner as to raise the rack spindle 26 and with it the table 25. This will cause the batch of dough 28 to be compressed between the carrier 27 and the pressure plate 29. When the dough fills completely the space between the carrier 27 and the plate 29, the parts are in the position shown in Fig. 4.

Upon the continued rotation of the shaft 12 and of the crank 14 thereon, the dough 28 is indeed compressed further to a slight extent. However, the limit of compression is reached very soon, and as a result thereof, the two members 16, 17 of the connecting rod will move one into the other, against the action of the spring 22. Shortly thereafter, the pin 61 will collide with the end 62 of the two-armed lever 62, 64, thus raising said end. The other end 64 of the lever will therefore be moved down to release the arm or lever 10, which then, under the influence of the spring 66, will be thrown to the right, until it comes in engagement with the rod 68 secured to the table 25. This movement of the lever 10 releases the clutch 3, 8 and thus causes a stoppage of the shafts 2 and 12 and of the crank 14 secured on the latter. The two members 16, 17 of the connecting rod continue to slide one into the other until the moment when the said parts are arrested by the disengaging of the clutch.

Figure 5:
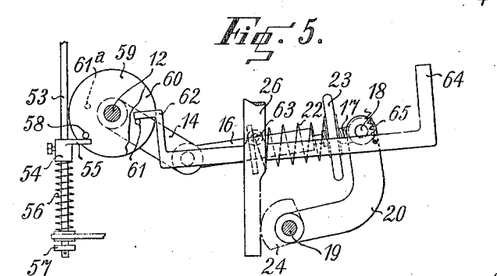
Fig. 5 is a detail showing a position following immediately after the one shown in Fig. 4, toward the end of the pressure operation.

At about the same time that the pin 61 strikes the lever end 62, the pin 58 on the disk 59 engages the lug 55 of the adjusting sleeve 54 secured to the rod 53 (Fig. 5). In consequence thereof, the further rotation of the shaft 12 will cause the rod 53 to be moved downward, so as to swing or rock the lever 52, 50 and thus lift the handle 49ᵃ, thus forcing the latch 49 to the right as indicated by the arrow in Fig. 2. This releases the rod 36 carrying the pressure plate 29, so that the spring 22 of the connecting rod 16, 17 (which spring is at that time under strong compression) will force the arm 20 still farther to the right and raise the table 25 still higher, whereby the batch of dough 28 is pressed against the dividing knife or knives 31 (Fig. 6).

The table 25 having reached its highest position, the rod 68 releases the lever 10, so that the latter, under the influence of the spring 66, is thrown still farther toward the right, carrying the rod 70 with it (Fig. 6). This movement of the rod 70 to the right is possible in this position, because the roller 71 carried by the arm 69 has been raised above the inclined surface 74 of said rod. The lateral movement of the rod 70 throws in the clutch 7, 73, thus causing the shaft 6 to be set in motion. By means of the bevel gearing 42, 40 and 43, 41 the rotation of the shaft 6 is transmitted to the eccentrics 38, 39, thus imparting a gyratory motion to the frame 37 with the dividing device 30, 31, 32, which gyratory motion will have a kneading effect upon the portions or lumps of dough contained in the compartments of the knife 31. It will be understood that this knife consists of blades crossing each other so as to produce compartments.

The pins 61, 61ª on the disk 60 preferably coöperate with the end 62 of the two-armed lever 62, 64 in such a manner that after each half-revolution of the crank 14 the shaft 2 will be arrested only when the crank has gone beyond the dead-center position, so that in the releasing positions of the clutch 3, 8 (Figs. 1 and 6), the crank 14 and its connecting rod 16, 17 have proceeded beyond the dead-center position. One advantage of this arrangement is that it facilitates the restarting of the crank drive after each stoppage; but particularly in regard to the upward movement of the table 25, this arrangement offers the advantage that even at the beginning of the kneading operation the table 25 with the carrier 27 thereon has been removed a slight distance from the lower edges of the dividing knife 31, so that during the subsequent kneading movement the edges of the knife cannot rub against the carrier 27 and thus produce a detrimental resistance.

At the same time that the table 25 reaches its highest position (Fig. 6) the rack bar 81 has been pressed into mesh with the spur pinion 78 (journaled on the stud 75) by means of the roller 85 journaled upon the arm 83 of the table 25. During the subsequent kneading operation the frame 37 and the arm 79 thereon are given a gyratory motion, and each time said arm moves toward the right, it engages between two teeth 80 of the escapement wheel 76 (Figs. 8 and 10) and feeds this wheel the distance of one tooth. The spur pinion 78 being turned at the same time, raises the rack bar 81 until the inclined surface 88 of this bar engages the roller 89 (Fig. 9), so as to press the lever 10 toward the left. This again throws in the clutch 3, 8, starting another rotation of the shaft 2 and of the parts connected therewith. In this operation, the connecting rod 16, 17 again carries the arm 20 toward the left, so that the table 25 is lowered.

During this downward movement of the table the kneading operation continues for a short time, so that the lumps of dough lying on the carrier 27 are screwed, as it were, out of the compartments of the dividing knife 31. However, as soon as the roller 71 with the table 25 have been lowered enough to cause the roller to pass beyond the inclined surface 74, such roller will force the rod 70 toward the left, thus releasing the clutch 7, 73 and arresting the kneading operation.

Furthermore, during the downward movement of the table 25 the roller 86 forces the rack bar 81 toward the left (Fig. 8) until it is out of mesh with the pinion 78. The bar 81 being thus released will then slide down in its guides 82 until the stop 90 engages the spring buffer 92 (Fig. 2). At this time the inclined surface 88 will again release the lever 10, allowing the latter to return to its initial position shown in Fig. 1, during which return movement it will again release the clutch 3, 8 as soon as the pin 61ª of the disk 60 strikes the end 62 of the lever 62, 64 and thus forces the end 64 of said lever down from behind the lever 10. In this manner I also arrest the rotation of the main shaft 2 and the operation of the crank drive 14, 16, 17.

The duration of the kneading operation obviously depends on the time interval between the throwing the rack 81 into mesh with the pinion 78, and the striking of the surface 88 against the roller 89, since the engagement of the parts 88, 89 causes the lever 10 to be thrown over and the clutch 3, 8 to be thrown in, so that the shaft 2 will be set in motion again and start the downward movement of the table 25, during which movement the shifting lever 70 of the clutch 7, 73 is brought into the releasing position. The length of this time interval may be varied by adjusting the sleeve 94 of the buffer 92 up or down in the clamping jaws 93. In this manner I am enabled to adjust the length of the kneading operation according to the requirements of the individual kinds of dough treated.

During the kneading operation, the pressure plate 29 secured to the spindle 36 and balanced by the counterweight 47, moves upward gradually as the height or thickness of the lumps of dough increases during the kneading operation. The weight 47 is so adjusted that the plate 29 overbalances it slightly, and when the table 25 moves down, the pressure plate 29 resumes its lower position, allowing the latch 49 to take its place on top of the upper end of the rod 36. This is possible because the rod 53 with the lever 50, 52, under the influence of the spring 56, have resumed the position shown in Fig. 1, as soon as the pin 58 has cleared the lug 55.

I also wish to point out that the degree of compression of the spring 22 and therefore the force acting to press the dough on the plate or carrier 27, after the compression of said dough, into the dividing knife 31, may be varied by adjusting the threaded disk or collar 23 lengthwise on the member 17 of the connecting rod. This can be done to meet varying conditions of greater or smaller firmness or toughness of the dough employed.

The machine may also be used solely as a dough-dividing or cutting machine, without operating the kneading mechanism. All that is required for this purpose is removing the belt 5, and pressing the lever 10 to one side after every pressing and dividing operation, so as to withdraw the lumps of dough from the compartments of the knife. This mode of using the machine is of importance for the reason that in practice it may be desired frequently only to divide or cut the dough, but not to knead it. Various modifications may be made without departing from the nature of my invention as set forth in the appended claims.

I claim as my invention:

1. In a machine of the class described, means for compressing and dividing the material, mechanism for subjecting the material to a kneading operation, means for starting the machine, and mechanism, operated by the machine itself after it has been started, for causing the compression and cutting of the material with the subsequent kneading thereof and the stoppage of the machine, to be effected automatically in proper succession.

2. In a machine of the class described, means for compressing and dividing the material, mechanism for subjecting the material to a kneading operation, means for starting the machine, and mechanism, operated by the machine itself after it has been started, for causing successively the compression and cutting of the material, the kneading of the material and the withdrawal of the kneaded material, and the stoppage of the machine.

3. In a machine of the class described, means for compressing and dividing the material, mechanism for subjecting the material to a kneading operation, means for starting the machine, and mechanism, operated by the machine itself after it has been started, for causing successively the compression and cutting of the material, the kneading and withdrawal of the material, and the stoppage of the machine, said last-named mechanism including an adjusting device whereby the length of the kneading operation may be varied.

4. In a machine of the class described, a carrier for supporing the material, a device for cutting or dividing the material on said carrier, the latter and the cutting device being relatively movable so as to bring them together for cutting the material, or separate them to withdraw the material from the cutting device, a shaft controlling the relative movement of said cutting device and said carrier, means for kneading the material while in the cutting device, a second shaft controlling said kneading means, and a disconnectible operative connection between said two shafts.

5. In a machine of the class described, a table for carrying the material, means for pressing and cutting the material on said table, the said table being movable vertically toward and from said pressing and cutting means, a crank shaft for controlling the vertical movement of said table, the stroke or throw of the crank on said shaft in one direction effecting the upward movement of said table, while the throw of the crank in the opposite direction effects the downward movement of the table, projections connected with said shaft, a drive shaft operatively connected with said crank shaft, and means, operated by said projections, for arresting the drive shaft and thus stopping the crank shaft also.

6. In a machine of the class described, a table for carrying the material, means for pressing and cutting the material on said table, the said table being movable vertically toward and from said pressing and cutting means, a crank shaft for controlling the vertical movement of the table, the stroke or throw of the crank on said shaft in one direction effecting the upward movement of said table, while the throw of the crank in the opposite direction effects the downward movement of the table, projections connected with said shaft, a drive shaft operatively connected with said crank shaft, and means, operated by said projections, for arresting the drive shaft and thus stopping the crank shaft also, at a time when the crank on the latter has just gone beyond the dead-center position.

7. In a machine of the class described, a table for carrying the material, means for pressing and cutting the material on said table, the said table being movable toward and from said pressing and cutting means, a crank shaft, an extensible rod connecting said crank shaft operatively with said table and consisting of a plurality of members, a spring forming a yielding connection between the members of said connecting rod, a latch for temporarily arresting the movement of said table, and means for releasing said latch to cause the spring to press the material against the said cutting means.

8. In a machine of the class described, a table for carrying the material, means for pressing and cutting the material on said table, the said table being movable toward and from said pressing and cutting means, a crank shaft controlling the movement of said table, mechanism for kneading the material while in the cutting means, a shaft controlling the operation of said mechanism, a lever for starting and stopping said shaft, and means, controlled by said crank shaft, for actuating the said lever.

9. In a machine of the class described, a table for carrying the material, means for cutting the material on the table, the said table being movable toward and from said cutting means, a shaft controlling the movement of the table, eccentrics for imparting a kneading movement to said cutting means, a lever for starting and stopping said shaft, and means, operatively connected with said eccentrics, for shifting said lever after a predetermined number of throws of said eccentrics to start said shaft and carry the kneaded material away from the cutting means.

10. In a machine of the class described, a table for carrying the material, means for cutting the material on said table, the said table being movable toward and from said cutting means, a shaft controlling the movement of the table, eccentrics for imparting a kneading movement to said cutting means, and means, operatively connected with said eccentrics, for starting said shaft after a predetermined number of throws of said eccentrics and causing the kneaded material to be moved away from said cutting means while the latter is still performing its kneading movement.

11. In a machine of the class described, a table for carrying the material, means for cutting the material on the table, the said table being movable up and down, a rack bar, a pinion with which said rack is thrown into mesh at the upward movement of the table, eccentrics for imparting a kneading movement to said cutting means, an escapement wheel advanced tooth by tooth at each successive throw of the eccentrics and connected with said pinion, a stop on said rack bar, a lever adapted to be engaged by said stop after a predetermined number of throws of said eccentrics, and a shaft, controlled by said lever, and operatively connected with the table to move it toward or from the cutting means.

12. In a machine of the class described, a table for carrying the material, means for cutting the material on said table, the said table being movable up and down, a rack bar, a pinion adapted to mesh with said bar at the upward movement of the table, means for imparting a kneading movement to said cutting means, a shaft having operative connections to control the movement of said table, means, in operative connection with said shaft, for bringing said rack bar out of engagement with the pinion, and means, controlled by said rack bar, for starting said shaft.

13. In a machine of the class described, a table for carrying the material, means for cutting and kneading the material, a rack disconnected from the kneading means while the latter is inactive, means for throwing the rack into operative connection with the kneading means while the latter is active, a projection on said rack and means operated by said projection to arrest the motion of the machine, and a support determining the position of the rack before its connection with the kneading mechanism, said support being adjustable in the direction of the rack's longitudinal movement, for varying the distance separating the initial position of said projection from its operating position, and thus varying the length of the kneading operation.

In testimony whereof I have signed this specification.

HERMANN BERTRAM.

Witnesses:
RUDOLPH FRICKE,
MARGARETE FRITZSCHE.